United States Patent
Shi

(10) Patent No.: US 11,354,211 B2
(45) Date of Patent: Jun. 7, 2022

(54) METHOD AND APPARATUS FOR PERFORMING TEST FOR CPU, AND ELECTRONIC DEVICE

(71) Applicant: ZHENGZHOU YUNHAI INFORMATION TECHNOLOGY CO., LTD., Henan (CN)

(72) Inventor: Deli Shi, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 0 days.

(21) Appl. No.: 17/270,874

(22) PCT Filed: May 30, 2019

(86) PCT No.: PCT/CN2019/089276
§ 371 (c)(1),
(2) Date: Feb. 24, 2021

(87) PCT Pub. No.: WO2020/038039
PCT Pub. Date: Feb. 27, 2020

(65) Prior Publication Data
US 2021/0200651 A1 Jul. 1, 2021

(30) Foreign Application Priority Data
Aug. 24, 2018 (CN) .......................... 201810971482.3

(51) Int. Cl.
G06F 11/00 (2006.01)
G06F 11/263 (2006.01)
G06F 11/22 (2006.01)

(52) U.S. Cl.
CPC ........ *G06F 11/263* (2013.01); *G06F 11/2236* (2013.01)

(58) Field of Classification Search
CPC .......................... G06F 11/263; G06F 11/2236
See application file for complete search history.

(56) References Cited

U.S. PATENT DOCUMENTS 4,373,416 A * 2/1983 Endo ................. G10H 1/0575
84/627
6,825,627 B2 * 11/2004 Berroth ................. H02P 6/14
318/599

(Continued)

FOREIGN PATENT DOCUMENTS

CN 103969482 A 8/2014
CN 103969491 A 8/2014

(Continued)

OTHER PUBLICATIONS

International Search Report for PCT/CN2019/089276 dated Sep. 4, 2019, ISA/CN.

*Primary Examiner* — Loan L. T. Truong
(74) *Attorney, Agent, or Firm* — Yue (Robert) Xu; Apex Attorneys at Law, LLP

(57) ABSTRACT

A method and an apparatus for performing a test for a CPU, and an electronic device. A decay command in a SETWP test and a command-executing duration corresponding to each command subsequent to the decay command can be automatically deployed. Thereby, the SETWP test is correctly performed for the CPU to obtain a test result. It is not necessary to rely on manual adjustment on a parameter of a delay corresponding to each command.

10 Claims, 6 Drawing Sheets

```
┌─────────────────────────────────────────────────────────┐
│ Execute a SETWP test for a CPU, determine a first       │── S11
│ command-executing duration corresponding to a decay     │
│ command in the SETWP test, and deploy the first         │
│ command-executing duration                              │
└─────────────────────────────────────────────────────────┘
                          │
                          ▼
┌─────────────────────────────────────────────────────────┐
│ Execute the SETWP test again, and adjust a command-     │── S12
│ executing duration corresponding to each command        │
│ subsequent to the decay command in the SETWP test       │
└─────────────────────────────────────────────────────────┘
                          │
                          ▼
┌─────────────────────────────────────────────────────────┐
│ Execute the SETWP test again to acquire test data, and  │── S13
│ determine whether the CPU meets a requirement           │
│ according to the test data                              │
└─────────────────────────────────────────────────────────┘
```

(56) References Cited

U.S. PATENT DOCUMENTS

| | | | | |
|---|---|---|---|---|
| 7,109,475 B1* | 9/2006 | Hardman | | H01J 49/40 |
| | | | | 250/281 |
| 2002/0163363 A1* | 11/2002 | Parkin | | G06F 5/06 |
| | | | | 326/93 |
| 2006/0203599 A1* | 9/2006 | Doyle | | G11C 29/024 |
| | | | | 365/230.06 |
| 2007/0058451 A1* | 3/2007 | Uchida | | G11C 7/1006 |
| | | | | 365/189.05 |
| 2008/0122666 A1* | 5/2008 | Yoshizaki | | H03M 9/00 |
| | | | | 341/101 |
| 2008/0278223 A1* | 11/2008 | Kernahan | | H03H 11/265 |
| | | | | 323/267 |
| 2009/0182793 A1* | 7/2009 | Love | | G06F 16/20 |
| 2009/0323446 A1* | 12/2009 | Zhang | | G11C 29/026 |
| | | | | 365/201 |
| 2013/0086396 A1* | 4/2013 | Liu | | G06F 1/266 |
| | | | | 713/300 |
| 2013/0307509 A1* | 11/2013 | Henzler | | H02M 3/157 |
| | | | | 323/283 |
| 2013/0342260 A1* | 12/2013 | Bohm | | G06F 13/4295 |
| | | | | 327/333 |
| 2014/0111655 A1* | 4/2014 | Hwang | | G09G 3/3208 |
| | | | | 348/181 |
| 2014/0126677 A1* | 5/2014 | Fritsch | | H04L 7/04 |
| | | | | 375/362 |
| 2014/0215106 A1 | 7/2014 | Li | | |
| 2014/0215273 A1 | 7/2014 | Yu | | |
| 2014/0258599 A1* | 9/2014 | Rostoker | | G06F 12/1441 |
| | | | | 711/163 |
| 2014/0380070 A1 | 12/2014 | Hua | | |
| 2015/0008940 A1* | 1/2015 | George | | G01R 31/31727 |
| | | | | 324/613 |
| 2018/0088647 A1 | 3/2018 | Suryanarayanan et al. | | |
| 2019/0056976 A1* | 2/2019 | Gebauer | | G06F 9/52 |
| 2019/0310587 A1* | 10/2019 | Kim | | G04F 10/005 |
| 2020/0252257 A1* | 8/2020 | Herbordt | | H04L 27/362 |

FOREIGN PATENT DOCUMENTS

| | | |
|---|---|---|
| CN | 104081312 A | 10/2014 |
| CN | 104572373 A | 4/2015 |
| CN | 109189623 A | 1/2019 |
| JP | S62242256 A | 10/1987 |

* cited by examiner

METHOD AND APPARATUS FOR PERFORMING TEST FOR CPU, AND ELECTRONIC DEVICE

The present application is the national phase of International Application No. PCT/CN2019/089276, titled "CPU TESTING METHOD AND APPARATUS, AND ELECTRONIC DEVICE" filed on May 30, 2019, which claims the priority to Chinese Patent Application No. 201810971482.3, titled "METHOD AND APPARATUS FOR PERFORMING TEST FOR CPU, AND ELECTRONIC DEVICE", filed on Aug. 24, 2018 with the China National Intellectual Property Administration, which is incorporated herein by reference in its entirety.

FIELD

The present disclosure relates to the technical field of servers, and in particular to a method and an apparatus for performing a test for a CPU, and an electronic device.

BACKGROUND

During research and development, motherboard of a server needs to be tested in detail and strictly, in order to check whether the motherboard functions normally and all parameters meet a design standard. A central processing unit (CPU) is a core component on the motherboard, and thus tests for the CPU attract a lot of concerns.

When performing a SETWP test for the CPU, a decay test starts after a command for SVID Dn changes from "Fast" to "Decay" and a value of SETWP date changes from 22 to 32. A parameter of a delay corresponding to each command needs to be manually adjusted, in a case that an error occurs when executing the decay command or a subsequent command. Otherwise, the decay command and the subsequent commands cannot be correctly executed.

It consumes a lot of time and labor to adjust manually the parameter of the delay corresponding to each command.

SUMMARY

In view of this, a method and an apparatus for performing a test for a CPU, and an electronic device are provided according to embodiments of the present disclosure, to address an issue that it consumes a lot of time and labor to adjust manually a parameter of a delay corresponding to each command.

Following technical solutions are provided according to embodiments of the present disclosure to address the above technical issues.

A method for CPU testing is provided, including:
executing a SETWP test for a CPU, determining a first command-executing duration corresponding to a decay command in the SETWP test, and deploying the first command-executing duration;
executing the SETWP test again, and adjusting a command-executing duration corresponding to each command subsequent to the decay command in the SETWP test;
executing the SETWP test again to acquire test data, and determining whether the CPU meets a requirement according to the test data;
where the test data includes a temporal difference between a moment at which an earliest rising edge appears in a generated cso signal and a moment at which each falling edge appears in a generated alert signal.

In a preferable embodiment, determining the first command-executing duration corresponding to the decay command in the SETWP test, includes:
acquiring a first moment at which the earliest rising edge appears in the generated cso signal and a second moment at which an earliest falling edge appears in the generated alert signal;
calculating a first temporal difference between the first moment and the second moment; and
calculating the first command-executing duration according to the first temporal difference.

In a preferable embodiment, adjusting the command-executing duration corresponding to each command subsequent to the decay command in the SETWP test, includes:
acquiring a falling edge which is $i^{th}$ earliest in the generated alert signal, and determining a command corresponding to the falling edge, where i is a positive integer greater than or equal to 2;
determining whether the command is i-$1^{th}$ in location among all commands subsequent to the decay command;
determining a second command-executing duration corresponding to the command, which is i-$1^{th}$ in location among all commands subsequent to the decay command, and deploying the second command-executing duration, in a case that the command is determined to be i-$1^{th}$ in location among all commands subsequent to the decay command;
swapping the command and another command that is i-$1^{th}$ in location among all commands subsequent to the decay command, determining a second command-executing duration corresponding to the command after the swapping, and deploying the second command-executing duration, in a case that the command is determined not to be i-$1^{th}$ in location among all commands subsequent to the decay command;
determining whether the command is a final command that needs to be executed in the SETWP test; and
returning to a process of acquiring a falling edge which is $i^{th}$ earliest in the generated alert signal and acquiring a command corresponding to the falling edge, unless the second command-executing duration corresponding to each command subsequent to the decay command is deployed, in a case that the command is determined not to be the final command.

In a preferable embodiment, determining the second command-executing duration corresponding i-$1^{th}$ in location among all commands subsequent to the decay command, includes:
acquiring a third moment at which the earliest rising edge appears in the generated cso signal and a fourth moment at which the falling edge appears in the generated alert signal;
calculating a second temporal difference between the third moment and the fourth moment; and calculating and deploying the second command-executing duration, according to the second temporal difference.

In a preferable embodiment, calculating the first command-executing duration according to the first temporal difference, includes:
calculating a ratio of the first temporal difference to a preset value, and determining the ratio as the first command-executing duration.

An apparatus for CPU testing is further provided, including:
a first deploying module, configured to execute a SETWP test for a CPU, determine a first command-executing duration corresponding to a decay command in the SETWP test, and deploy the first command-executing duration;

a second deploying module, configured to execute the SETWP test again, and adjust a command-executing duration corresponding to each command subsequent to the decay command in the SETWP test;

a data acquiring module, configured to execute the SETWP test again to acquire test data, and determine whether the CPU meets a requirement according to the test data; and where the test data includes a temporal difference between a moment at which an earliest rising edge appears in a generated cso signal and a moment at which each falling edge appears in a generated alert signal.

In a preferable embodiment, the first deploying module includes:

a first acquiring sub-module, configured to acquire a first moment at which the earliest rising edge appears in the generated cso signal and a second moment at which an earliest falling edge appears in the generated alert signal;

a first calculating sub-module, configured to calculate a first temporal difference between the first moment and the second moment; and a second calculating sub-module, configured to calculate the first command-executing duration according to the first temporal difference.

In a preferable embodiment, the second deploying module includes:

a second acquiring sub-module, configured to acquire a falling edge which is $i^{th}$ earliest in the generated alert signal, and determine a command corresponding to the falling edge, where i is a positive integer greater than or equal to 2;

a first determining sub-module, configured to determine whether the command is i-$1^{th}$ in location among all commands subsequent to the decay command;

a deploying sub-module, configured to determine a second command-executing duration corresponding to the command, which is i-$1^{th}$ in location among all commands subsequent to the decay command, and deploy the second command-executing duration, in a case that the first determining sub-module determines that the command is i-$1^{th}$ in location among all commands subsequent to the decay command;

a swapping sub-module, configured to swap the command and another command that is i-$1^{th}$ in location among all commands subsequent to the decay command, in a case that the first determining sub-module determines that the command is not i-$1^{th}$ in location among all commands subsequent to the decay command, where the deploying sub-module is configured to determine the second command-executing duration corresponding to the command and deploy the second command-executing duration, after the swapping sub-module swaps the command and the command i-$1^{th}$ in location; and a second determining sub-module, configured to determine whether the command is a final command that needs to be executed in the SETWP test;

where the second determining sub-module is further configured to acquire a falling edge $i^{th}$ earliest in the generated alert signal and acquire a command corresponding to the falling edge, unless the second command-executing duration corresponding to each command subsequent to the decay command is deployed, in a case that the second determining sub-module determines that command is not the final command.

In a preferable embodiment, the deploying sub-module includes:

an acquiring unit, configured to acquire a third moment at which the earliest rising edge appears in the generated cso signal and a fourth moment at which the falling edge appears in the generated alert signal;

a first calculating unit, configured to calculate a second temporal difference between the third moment and the fourth moment; and a second calculating unit, configured to calculate and deploy the second command-executing duration, according to the second temporal difference.

An electronic device is further provided, including:
a memory, configured to store a program, and
a processor, configured to invoke the program for:
executing a SETWP test for a CPU, determining a first command-executing duration corresponding to a decay command in the SETWP test, and deploying the first command-executing duration;

executing the SETWP test again, and adjusting a command-executing duration corresponding to each command subsequent to the decay command in the SETWP test;

executing the SETWP test again to acquire test data, and determining whether the CPU meets a requirement according to the test data;

where the test data includes a temporal difference between a moment at which an earliest rising edge appears in a generated cso signal and a moment at which each falling edge appears in a generated alert signal.

Embodiments of the present disclosure achieves following beneficial effects in comparison with conventional technology.

The method and the apparatus for performing the test for the CPU, and the electronic device are provided according embodiments of the present disclosure. The decay command in the SETWP test and the command-executing duration corresponding to each command subsequent to the decay command can be automatically deployed. Thereby, the SETWP test is correctly performed for the CPU to obtain a test result. It is not necessary to rely on manual adjustment on a parameter of a delay corresponding to each command.

BRIEF DESCRIPTION OF THE DRAWINGS

For clearer illustration of technical solutions according to embodiments of the present disclosure or conventional technology, hereinafter briefly described are the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION

In order to help those skilled in the art better understand solutions of the present disclosure, hereinafter technical solutions in embodiments of the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

Figures 1, 2:
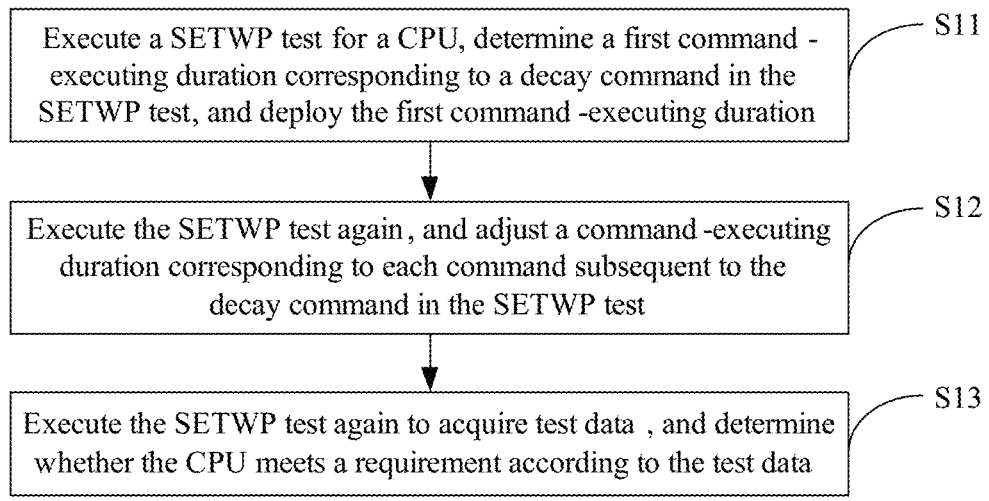
FIG. 1 is a flow chart of a method for performing a test for a CPU according to an embodiment of the present disclosure.
FIG. 2 is a schematic diagram of a scenario of performing a test for a CPU according to an embodiment of the present disclosure.

A method for performing a test for a CPU is provided according to an embodiment of the present disclosure. Reference is made to FIG. 1, where the method includes steps S11 to S13.

In step S11, a SETWP test is executed for a CPU, a first command-executing duration corresponding to a decay command in the SETWP test is determined, and the first command-executing duration is deployed.

Reference is made to FIG. 2 for a specific embodiment. In a former half of the test, the commands for SVID Dn and SVID Up are both "Fast". In such case, a corresponding waveform can be obtained when an official script is directly executed, and then corresponding data is measured.

Figures 3, 4:
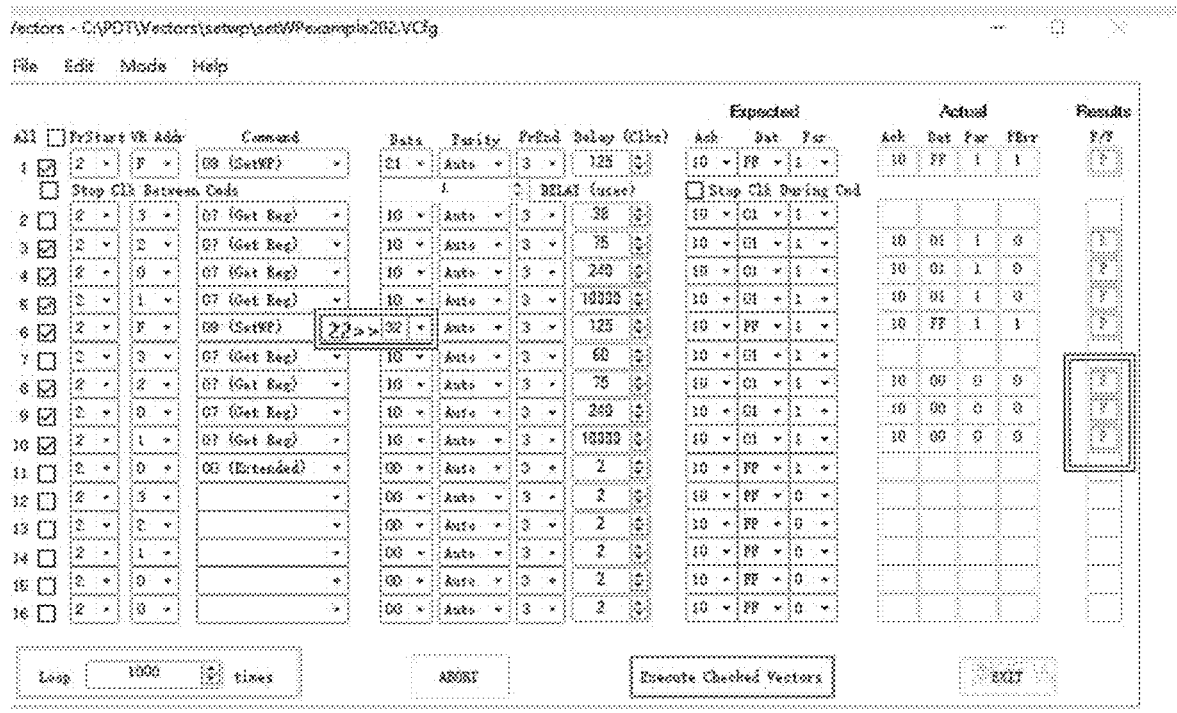
FIG. 3 is a schematic diagram of another scenario of performing a test for a CPU according to an embodiment of the present disclosure.
FIG. 4 is a schematic diagram of another scenario of performing a test for a CPU according to an embodiment of the present disclosure.

In a latter half of the test, the command for SVID Dn changes from "Fast" to "Decay", as shown in FIG. 3.

Reference is made to FIG. 4. Commands No. 1, 3, 4, 5, 6, 8, 9, and 10 need to be executed in the test. Commands No. 1, 3, 4, and 5 are for the former half of the test, while commands 6, 8, 9, and 10 are for the latter half of the test. Embodiments of the present disclosure focus mainly on the latter half of the test.

When the latter half of the test is executed, a value of SETWP date should be changed from 22 to 32, besides a command for the SVID Dn is changed from "Fast" to "Decay", as shown in FIG. 4. Then, the commands No. 6, 8, 9, and 10 are executed.

After the commands No. 6, 8, 9, and 10 are executed for the first time, a result of executing the commands No. 8, 9, and 10 is "F", meaning an error ("Fail"), as shown in the last column in FIG. 4. Then, the first command-executing duration corresponding to the decay command in the SETWP test is determined and deployed. The first command-executing duration is a value of "Delay" in row No. 6 in FIG. 4.

Figure 5:
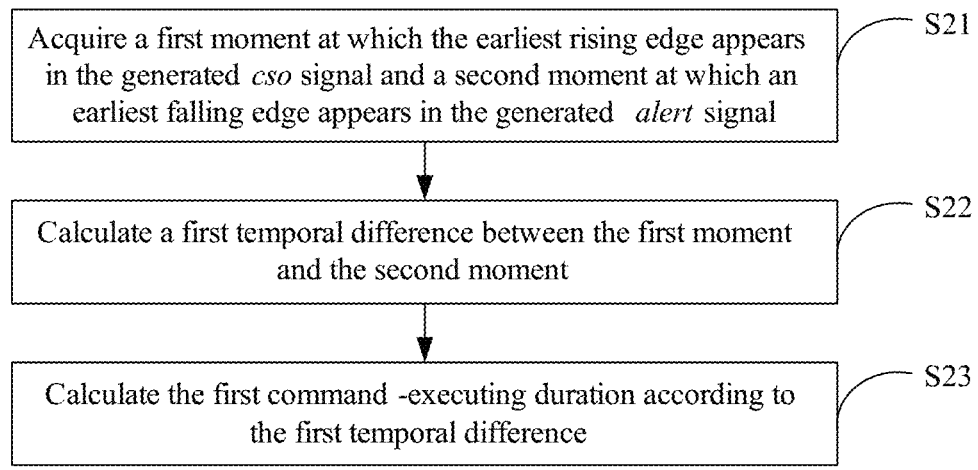
FIG. 5 is a flow chart of another method for performing a test for a CPU according to an embodiment of the present disclosure.
Figure 6:
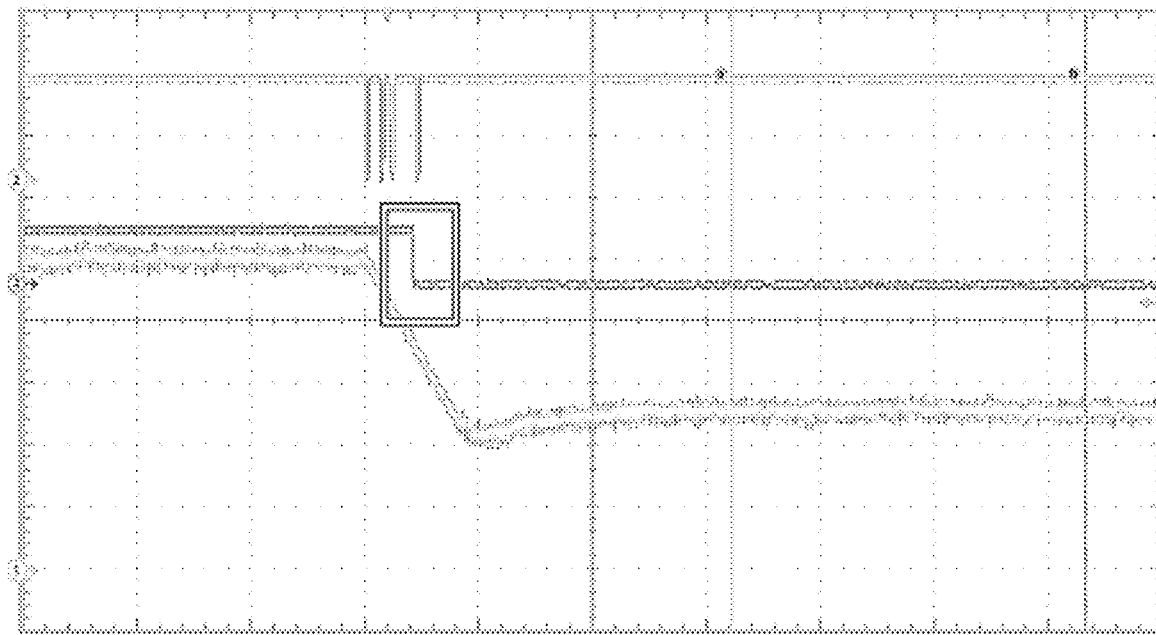
FIG. 6 is a schematic diagram of another scenario of performing a test for a CPU according to an embodiment of the present disclosure.

References are made to FIG. 5 and FIG. 6. An optional embodiment is based on this embodiment. A process of determining the first command-executing duration corresponding to the decay command in the SETWP test may include steps S21 to S23.

In step S21, a first moment at which the earliest rising edge appears in the generated cso signal and a second moment at which an earliest falling edge appears in the generated alert signal are acquired.

In a specific embodiment, the cso signal is a curve in an uppermost part of FIG. 6, and the alert signal is a curve in a middle part of FIG. 6. The first moment at which the earliest rising edge appears in the generated cso signal and the second moment at which the earliest falling edge appears in the generated alert signal are acquired.

In step S22, a first temporal difference between the first moment and the second moment is calculated.

In step S23, the first command-executing duration is calculated according to the first temporal difference.

A technician sets the first command-executing duration for executing the decay command.

An optional embodiment is based on this embodiment. The step S23 may include a following step.

A ratio of the first temporal difference to a preset value is calculated, and the ratio serves as the first command-executing duration.

In a specific embodiment, the preset value may be 40. That is, the first time command-executing duration is equal to the ratio of the first temporal difference to 40.

In step S12, the SETWP test is executed again, and a command-executing duration corresponding to each command subsequent to the decay command in the SETWP test is adjusted.

In a specific embodiment, after the first command-executing duration corresponding to the decay command is deployed, the SETWP test is executed again. Then, the command-executing duration corresponding to each command subsequent to the decay command in the SETWP test is adjusted in turn.

Figures 7, 8:
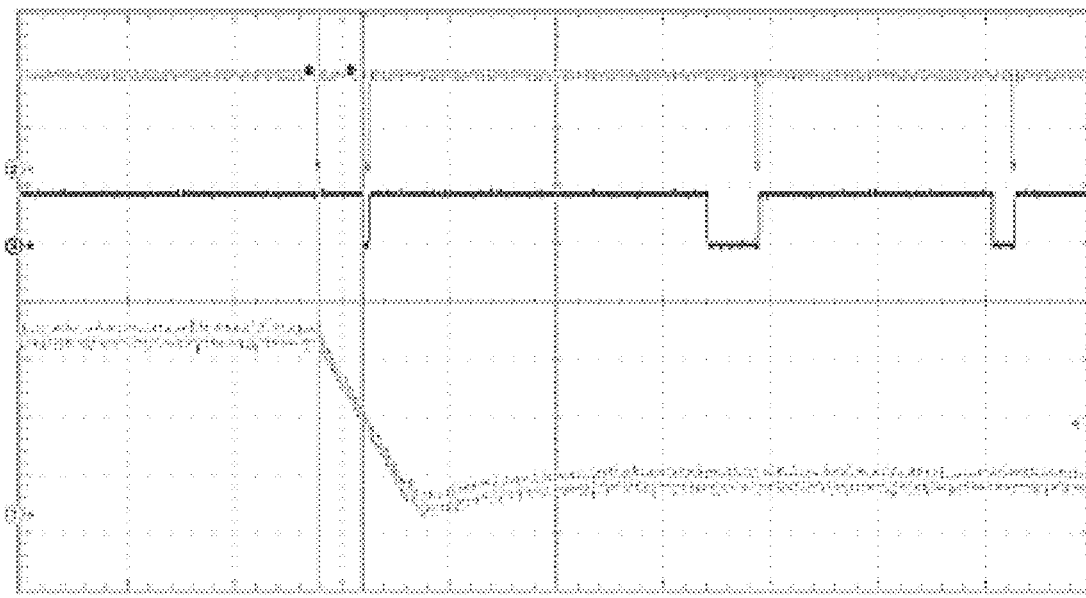
FIG. 7 is a schematic diagram of another scenario of performing a test for a CPU according to an embodiment of the present disclosure.
FIG. 8 is a schematic diagram of another scenario of performing a test for a CPU according to an embodiment of the present disclosure.

When the command-executing duration corresponding to each command subsequent to the decay command is deployed, the SETWP test can be normally executed, and the executing result of each command is "P", which means passing ("Pass"). A result of deploying the command-executing duration corresponding to each command subsequent to each decay command may be as shown FIG. 7. In FIG. 7, a parameter of "Delay" in each of the rows No. 6, 8, 9 and 10 is adjusted again.

In step S13, the SETWP test is again to acquire test data, and it is determined whether the CPU meets a requirement according to the test data.

The test data includes a temporal difference between a moment at which an earliest rising edge appears in a generated cso signal and a moment at which each falling edge appears in a generated alert signal.

In a specific embodiment, reference is made to FIG. 8, which is a graph of curves that are finally generated. There are three falling edges in the alert signal, and each of the three falling edges corresponds to a command of row No. 8, 9, or 10. Appearance of the falling edge means a corresponding command being executed. At such time, a curve of a voltage signal corresponding to such command is subject to a falling edge.

The temporal difference between the moment at which the earliest rising edge appears in the cso signal and the moment at which each falling edge appears in the generated alert signal is calculated. Thereby, a technician is capable to analyze whether a CPU is normal according to the calculated temporal difference.

The curve at a bottom part of FIG. 6 and FIG. 8 is a curve of a voltage signal corresponding to a command of row No. 8, 9, or 10.

In these embodiments, the decay command in the SETWP test and the command-executing duration corresponding to each command subsequent to the decay command can be automatically deployed. Thereby, the SETWP test is correctly performed for the CPU to obtain a test result. It is not necessary to rely on manual adjustment on a parameter of a delay corresponding to each command.

In addition, these embodiments provide a clear concept and a clear method for debugging to testing personnel. An issue of script errors is addressed, avoiding a waste of time due to random manual modification. Thereby, a success rate of debugging is increased with conciseness and high efficiency.

Figure 9:
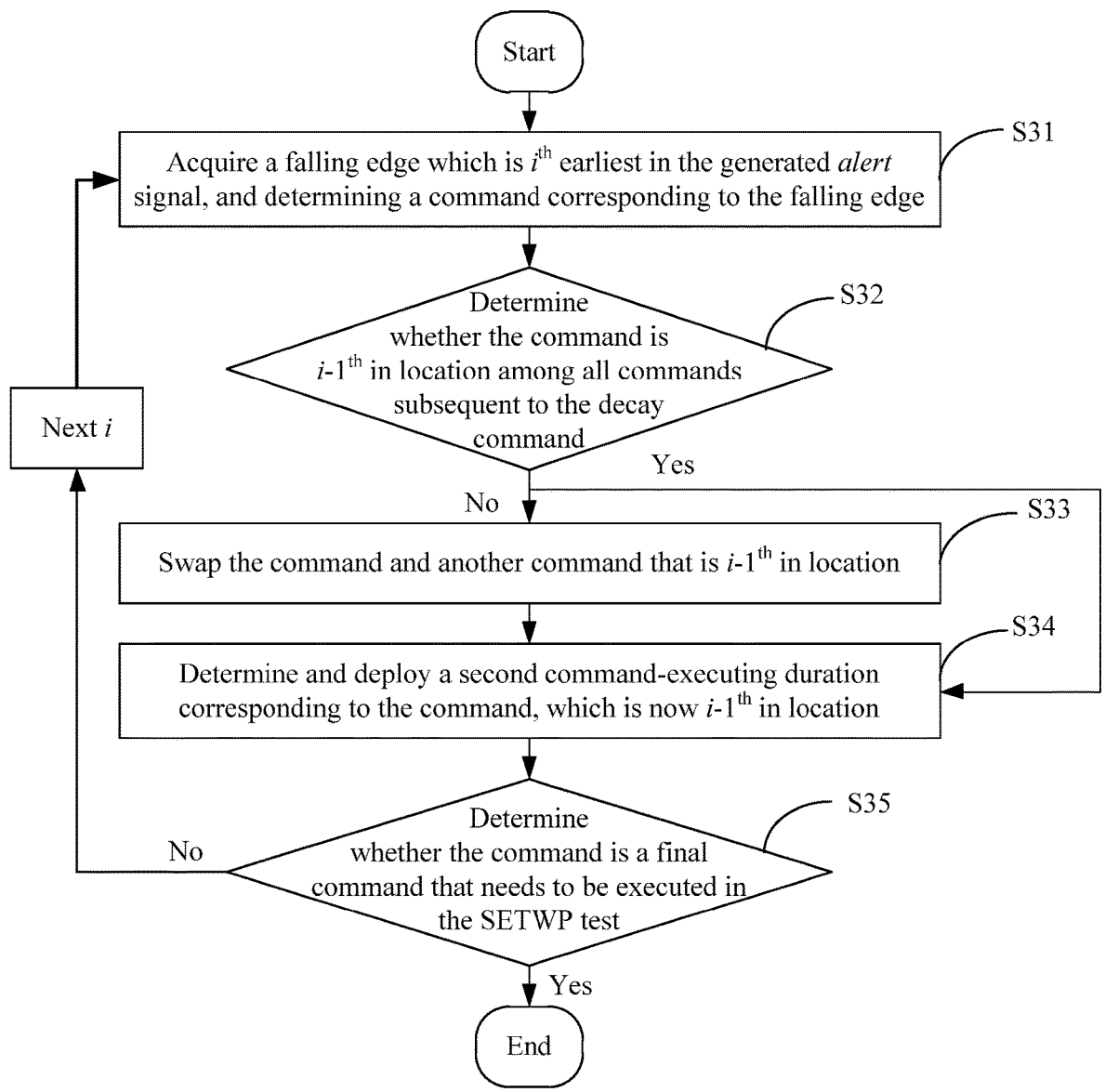
FIG. 9 is a flow chart of another method for performing a test for a CPU according to an embodiment of the present disclosure.

Reference is made to FIG. 9. In an optional embodiment based on any above embodiment, the step S12 may include steps S31 to S35.

In step S31, a falling edge which is $i^{th}$ earliest in the generated alert signal is acquired, and a command corresponding to the falling edge is determined.

i is a positive integer greater than or equal to 2.

In a specific embodiment, the step S12 starts from i=2. Each command corresponds to a voltage signal. A waveform of each voltage signal may be detected by a probe. When the $i^{th}$ earliest falling edge appears in the alert signal, a falling edge would appear in the waveform of the voltage signal as well. Then, the command corresponding to the voltage signal is determined, that is, the command corresponding to the $i^{th}$ earliest falling edge is determined.

In step S32, it is determined whether the command is $i-1^{th}$ in location among all commands subsequent to the decay command.

The process goes to step S33 in case of positive determination. The process goes to step S34 in case of negative determination.

In a specific embodiment, since the command-executing duration corresponding to each command subsequent to the decay command needs to be adjusted in turn, the command $i-1^{th}$ in location subsequent to the decay command is to be adjusted at present. In a case that i equal 2, it is the very next command after the decay command that is to be adjusted.

There is a possibility that the commands subsequent to the decay command are not executed in order. For example, the command $2^{nd}$ in location subsequent to the decay command is executed before the one $1^{st}$ in location subsequent to the decay command. Thus, there is a process of determining whether the command is the command $i-1^{th}$ in location among all commands subsequent to the decay command. In case of negative determination, an order of the commands needs to be adjusted.

In step S33, a second command-executing duration corresponding to the command, which is $i-1^{th}$ in location among all commands subsequent to the decay command, is determined and deployed.

In an optional embodiment based on this embodiment, the step S33 may include following steps 1) to 3).

In step 1), a third moment at which the earliest rising edge appears in the generated cso signal and a fourth moment at which the $i-1^{th}$ earliest falling edge appears in the generated alert signal are acquired.

In step 2), a second temporal difference between the third moment and the fourth moment is calculated.

In step 3), the second command-executing duration is calculated and deployed, according to the second temporal difference.

In a specific embodiment, the step S33 is implemented in a manner similar to steps S21 to S23. Reference is made to corresponding forgoing description, which is not repeated herein.

In step S34, the command and another command that is $i-1^{th}$ in location among all commands subsequent to the decay command are swapped.

In a specific embodiment, the command and the $i-1^{th}$ command are swapped. That is, the command and the $i-1^{th}$ command exchanges locations. Hence, the command may be prior in execution.

The process goes to the step S33 after the step S34.

In step S35, it is determined whether the command now $i-1^{th}$ in location is a final command that needs to be executed in the SETWP test.

The process terminates, in case of positive determination. The process returns to step S31, in case of negative determination. The process terminates until the second command-executing duration is deployed for each command subsequent to the decay command.

An objective of the step S35 is ensuring that the second command-executing duration is deployed for each command subsequent to the decay command.

After the second command-executing duration is deployed for each command subsequent to the decay command, the SETWP test can be normally executed, and the test data is acquired.

Before determining and deploying the first command-executing duration corresponding to the decay command in the SETWP test, a parameter "load" for a load on each voltage signal should be fixed, and the parameter "load" should not change freely during the entire debugging. A reason lies in that the parameter "load" influences a result of executing the script.

In this embodiment, the parameter "load" for each voltage signal is constant, eliminating unnecessary factors that affect execution of the script. A value of "Delay" is calculated based on the temporal difference. It is determined through probe detection whether an execution order of the script needs to be adjusted. Each command is adjusted in turn in the debugging process. Each failed ("Fail") command in the script is sequentially adjusted to be a passed ("Pass") command. Eventually, the whole script is successfully debugged.

Figure 10:
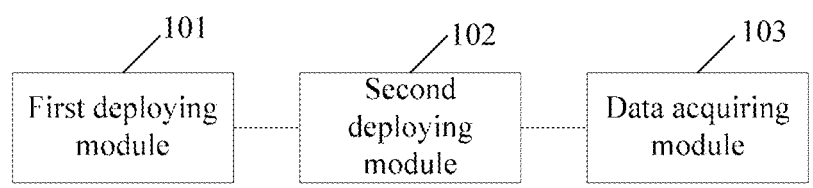
FIG. 10 is a schematic structural diagram of an apparatus for performing a test for a CPU according to an embodiment of the present disclosure.

On a basis of on the above method embodiments, an apparatus for performing a test for a CPU is provided according to another embodiment of the present disclosure. Reference is made to FIG. 10. The apparatus may include a first deploying module 101, a second deploying module 102, and a data acquiring module 103.

The first deploying module 101 is configured to execute a SETWP test for a CPU, determine a first command-executing duration corresponding to a decay command in the SETWP test, and deploy the first command-executing duration.

The second deploying module 102 is configured to execute the SETWP test again, and adjust a command-executing duration corresponding to each command subsequent to the decay command in the SETWP test.

The data acquiring module 103 is configured to execute the SETWP test again to acquire test data, and determine whether the CPU meets a requirement according to the test data.

The test data includes a temporal difference between a moment at which an earliest rising edge appears in a generated cso signal and a moment at which each falling edge appears in a generated alert signal.

In an embodiment, the first deploying module 101 may include a first acquiring sub-module, a first calculating sub-module, and a second calculating sub-module.

The first acquiring sub-module is configured to acquire a first moment at which the earliest rising edge appears in the generated cso signal and a second moment at which an earliest falling edge appears in the generated alert signal.

The first calculating sub-module is configured to calculate a first temporal difference between the first moment and the second moment.

The second calculating sub-module is configured to calculate the first command-executing duration according to the first temporal difference.

In one embodiment, when calculating the first command-executing duration according to the first temporal difference, the second calculating sub-module is specifically configured to calculate a ratio of the first temporal difference to a preset value, and determine the ratio as the first command-executing duration.

In these embodiments, the decay command in the SETWP test and the command-executing duration corresponding to each command subsequent to the decay command can be automatically deployed. Thereby, the SETWP test is correctly performed for the CPU to obtain a test result. It is not necessary to rely on manual adjustment on a parameter of a delay corresponding to each command.

In addition, these embodiments provide a clear concept and a clear method for debugging to testing personnel. An issue of script errors is addressed, avoiding a waste of time due to random manual modification. Thereby, a success rate of debugging is increased with conciseness and high efficiency.

An operation process of all modules and sub-modules in these embodiments refers to the corresponding part of the forgoing description, which is not repeated herein.

In an optional embodiment based on any foregoing apparatus embodiment, the second deploying module includes a second acquiring sub-module, a first determining sub-module, a deploying sub-module, a swapping sub-module, and a second determining sub-module.

The second acquiring sub-module is configured to acquire a falling edge which is $i^{th}$ earliest in the generated alert signal, and determine a command corresponding to the falling edge. i is a positive integer greater than or equal to 2.

The first determining sub-module is configured to determine whether the command is i-$1^{th}$ in location among all commands subsequent to the decay command.

The deploying sub-module is configured to determine a second command-executing duration corresponding to the command, which is i-$1^{th}$ in location among all commands subsequent to the decay command, and deploy the second command-executing duration, in a case that the first determining sub-module determines that the command is i-$1^{th}$ in location among all commands subsequent to the decay command.

The swapping sub-module is configured to swap the command and another command that is i-$1^{th}$ in location among all commands subsequent to the decay command, in a case that the first determining sub-module determines that the command is not i-$1^{th}$ in location among all commands subsequent to the decay command.

After the swapping sub-module swaps the command and the i-$1^{th}$ command, the deploying sub-module is configured to determine the second command-executing duration corresponding to the command, which is now i-$1^{th}$ in location among all commands subsequent to the decay command, and deploy the second command-executing duration.

The second determining sub-module is configured to determine whether the command is a final command that needs to be executed in the SETWP test.

In a case that the second determining sub-module determines that command is not the final command, the second determining sub-module is further configured to acquire a falling edge $i^{th}$ earliest in the generated alert signal and acquire a command corresponding to the falling edge, unless the second command-executing duration corresponding to each command subsequent to the decay command is deployed.

In an embodiment, the deploying sub-module includes an acquiring unit, a first calculating unit, and a second calculating unit.

The acquiring unit is configured to acquire a third moment at which the earliest rising edge appears in the generated cso signal and a fourth moment at which the falling edge appears in the generated alert signal.

The first calculating unit is configured to calculate a second temporal difference between the third moment and the fourth moment.

The second calculating unit is configured to calculate and deploy the second command-executing duration, according to the second temporal difference.

In this embodiment, the parameter "load" for each voltage signal is constant, eliminating unnecessary factors that affect execution of the script. A value of "Delay" is calculated based on the temporal difference. It is determined through probe detection whether an execution order of the script needs to be adjusted. Each command is adjusted in turn in the debugging process. Each failed ("Fail") command in the script is sequentially adjusted to be a passed ("Pass") command. Eventually, the whole script is successfully debugged.

An operation process of all modules and sub-modules in these embodiments refers to the corresponding part of the forgoing description, which is not repeated herein.

On a basis of any foregoing method embodiment or apparatus embodiment, an electronic device is provided according to another embodiment of the present disclosure. The device may include a memory and a processor.

The memory is configured to store a program.

The processor is configured to invoke the program for following operations.

A SETWP test is executed for a CPU, a first command-executing duration corresponding to a decay command in the SETWP test is determined, and the first command-executing duration is deployed.

The SETWP test is executed again, and a command-executing duration corresponding to each command subsequent to the decay command in the SETWP test is adjusted.

The SETWP test is again to acquire test data, and it is determined whether the CPU meets a requirement according to the test data.

The test data includes a temporal difference between a moment at which an earliest rising edge appears in a generated cso signal and a moment at which each falling edge appears in a generated alert signal.

In this embodiment, the decay command in the SETWP test and the command-executing duration corresponding to each command subsequent to the decay command can be automatically deployed. Thereby, the SETWP test is correctly performed for the CPU to obtain a test result. It is not necessary to rely on manual adjustment on a parameter of a delay corresponding to each command.

In addition, these embodiments provide a clear concept and a clear method for debugging to testing personnel. An issue of script errors is addressed, avoiding a waste of time due to random manual modification. Thereby, a success rate of debugging is increased with conciseness and high efficiency.

The above description of the embodiments enables those skilled in the art to implement or use the present disclosure. Various modifications to these embodiments are apparent to those skilled in the art, and the general principle defined herein may be implemented in other embodiments without deviating from the spirit or scope of the present disclosure. Therefore, the present disclosure is not limited to these embodiments described herein, but in accordance with the widest scope consistent with the principle and novel features disclosed herein.

The invention claimed is:

1. A method for performing a test for a CPU, comprising:
   executing a SETWP test for a CPU, determining a first command-executing duration corresponding to a decay command in the SETWP test, and deploying the first command-executing duration;
   executing the SETWP test again, and adjusting a command-executing duration corresponding to each command subsequent to the decay command in the SETWP test;
   executing the SETWP test again to acquire test data, and determining whether the CPU meets a requirement according to the test data;
   wherein the test data comprises a temporal difference between a moment at which an earliest rising edge appears in a generated cso signal and a moment at which each falling edge appears in a generated alert signal.

2. The method according to claim 1, wherein determining the first command-executing duration corresponding to the decay command in the SETWP test comprises:
   acquiring a first moment at which the earliest rising edge appears in the generated cso signal and a second moment at which an earliest falling edge appears in the generated alert signal;
   calculating a first temporal difference between the first moment and the second moment; and
   calculating the first command-executing duration according to the first temporal difference.

3. The method according to claim 1, wherein adjusting the command-executing duration corresponding to each command subsequent to the decay command in the SETWP test comprises, for each falling edge in the generated alert signal:
   acquiring said falling edge which is $i^{th}$ earliest in the generated alert signal, and determining a command corresponding to the falling edge, wherein i is a positive integer greater than or equal to 2;
   determining whether the command is $i-1^{th}$ in location among all commands subsequent to the decay command;
   determining a second command-executing duration corresponding to the command, and deploying the second command-executing duration, in a case that the command is determined to be $i-1^{th}$ in location among all commands subsequent to the decay command;
   swapping the command and another command that is $i-1^{th}$ in location among all commands subsequent to the decay command, determining a second command-executing duration corresponding to the command after the swapping, and deploying the second command-executing duration, in a case that the command is determined not to be $i-1^{th}$ in location among all commands subsequent to the decay command; and
   determining whether the command is a final command that needs to be executed in the SETWP test;
   wherein the command-executing duration corresponding to another command that is subsequent to the decay command and other than the command is adjusted, in response to determining that the command is not a final command that needs to be executed in the SETWP test.

4. The method according to claim 3, wherein determining the second command-executing duration corresponding $i-1^{th}$ in location among all commands subsequent to the decay command comprises:
   acquiring a third moment at which the earliest rising edge appears in the generated cso signal and a fourth moment at which said falling edge appears in the generated alert signal;
   calculating a second temporal difference between the third moment and the fourth moment; and
   calculating and deploying the second command-executing duration, according to the second temporal difference.

5. The method according to claim 2, wherein calculating the first command-executing duration according to the first temporal difference comprises:
   calculating a ratio of the first temporal difference to a preset value, and
   determining the ratio as the first command-executing duration.

6. An apparatus for performing a test for a CPU, comprising:
   a first deploying module, configured to execute a SETWP test for a CPU, determine a first command-executing duration corresponding to a decay command in the SETWP test, and deploy the first command-executing duration;
   a second deploying module, configured to execute the SETWP test again, and adjust a command-executing duration corresponding to each command subsequent to the decay command in the SETWP test;
   a data acquiring module, configured to execute the SETWP test again to acquire test data, and determine whether the CPU meets a requirement according to the test data; and
   wherein the test data comprises a temporal difference between a moment at which an earliest rising edge appears in a generated cso signal and a moment at which each falling edge appears in a generated alert signal.

7. The apparatus according to claim 6, wherein the first deploying module comprises:
   a first acquiring sub-module, configured to acquire a first moment at which the earliest rising edge appears in the generated cso signal and a second moment at which an earliest falling edge appears in the generated alert signal;
   a first calculating sub-module, configured to calculate a first temporal difference between the first moment and the second moment; and
   a second calculating sub-module, configured to calculate the first command-executing duration according to the first temporal difference.

8. The apparatus according to claim 6, wherein the second deploying module comprises:
   a second acquiring sub-module, configured to acquire a falling edge which is $i^{th}$ earliest in the generated alert signal, and determine a command corresponding to the falling edge, wherein i is a positive integer greater than or equal to 2;
a first determining sub-module, configured to determine whether the command is i-$1^{th}$ in location among all commands subsequent to the decay command;
a deploying sub-module, configured to determine a second command-executing duration corresponding to the command, and deploy the second command-executing duration, in a case that the first determining sub-module determines that the command is i-$1^{th}$ in location among all commands subsequent to the decay command;
a swapping sub-module, configured to swap the command and another command that is i-$1^{th}$ in location among all commands subsequent to the decay command, in a case that the first determining sub-module determines that the command is not i-$1^{th}$ in location among all commands subsequent to the decay command; and
a second determining sub-module, configured to determine whether the command is a final command that needs to be executed in the SETWP test;
wherein the deploying sub-module is further configured to determine the second command-executing duration corresponding to the command and deploy the second command-executing duration, after the swapping sub-module swaps the command and the command i-$1^{th}$ in location, in the case that the first determining sub-module determines that the command is not i-$1^{th}$ in location among all commands subsequent to the decay command;
wherein the second determining sub-module is further configured to acquire another falling edge in the generated alert signal and acquire a command corresponding to the another falling edge, unless the second command-executing duration corresponding to each command subsequent to the decay command has been deployed, in response to that the second determining sub-module determining that command is not the final command.

9. The apparatus according to claim 8, wherein the deploying sub-module comprises:
an acquiring unit, configured to acquire a third moment at which the earliest rising edge appears in the generated cso signal and a fourth moment at which the falling edge appears in the generated alert signal;
a first calculating unit, configured to calculate a second temporal difference between the third moment and the fourth moment; and
a second calculating unit, configured to calculate and deploy the second command-executing duration, according to the second temporal difference.

10. An electronic device, comprising:
a memory, configured to store a program, and
a processor, configured to invoke the program for:
executing a SETWP test for a CPU, determining a first command-executing duration corresponding to a decay command in the SETWP test, and deploying the first command-executing duration;
executing the SETWP test again, and adjusting a command-executing duration corresponding to each command subsequent to the decay command in the SETWP test;
executing the SETWP test again to acquire test data, and determining whether the CPU meets a requirement according to the test data;
wherein the test data comprises a temporal difference between a moment at which an earliest rising edge appears in a generated cso signal and a moment at which each falling edge appears in a generated alert signal.

* * * * *